June 29, 1965  J. V. MILLER  3,191,440
PRESSURE GAUGE INSTRUMENT
Filed Feb. 11, 1963
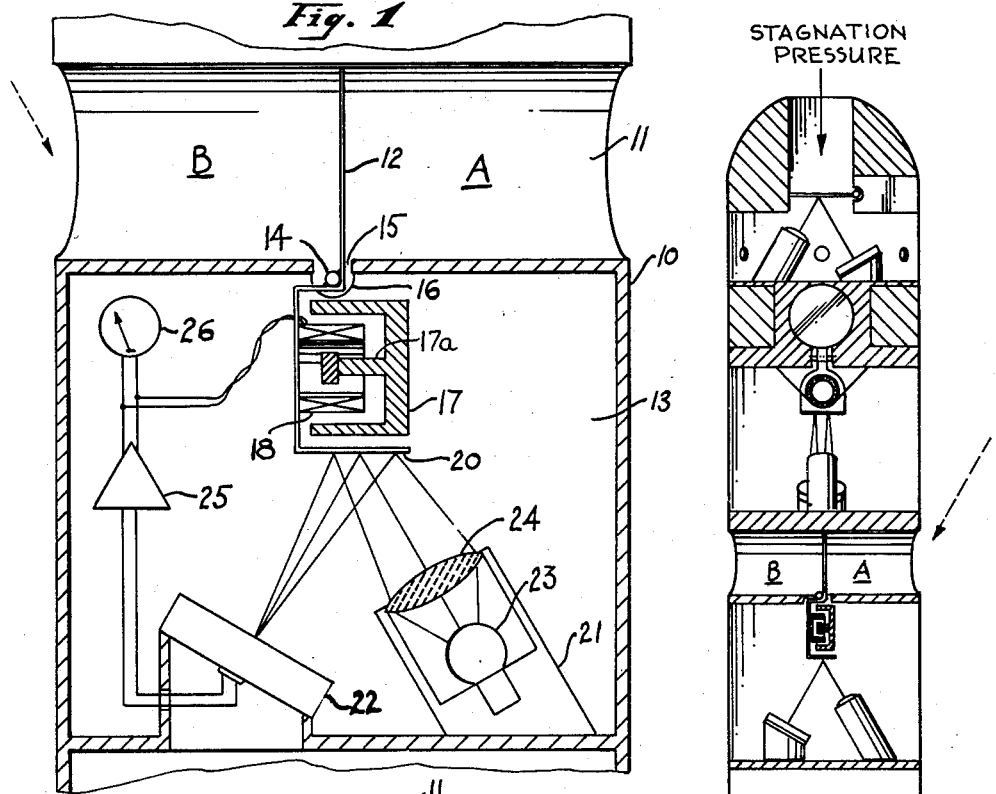
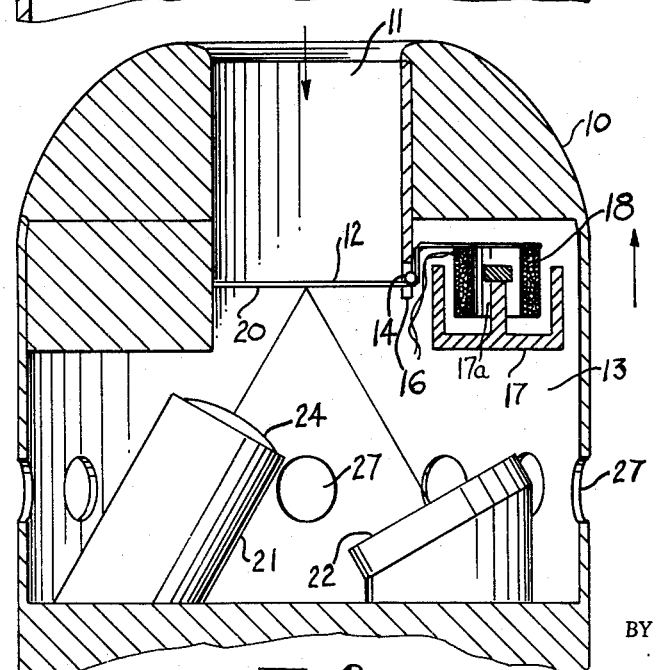
JACK V. MILLER
INVENTOR.
BY *Allen E. Botney*
ATTORNEY

United States Patent Office
3,191,440
Patented June 29, 1965

3,191,440
PRESSURE GAUGE INSTRUMENT
Jack V. Miller, Azusa, Calif., assignor to Electro-Optical Systems, Inc., Pasadena, Calif.
Filed Feb. 11, 1963, Ser. No. 257,495
7 Claims. (Cl. 73—398)

The present invention relates in general to pressure gauge devices and more particularly relates to a vane flow-meter type of pressure gauge that is based on electro-optical principles.

Roughly speaking, stagnation pressure may be defined as the pressure exerted by a fluid as a result of a vehicle moving through it. Conventional methods of measuring stagnation pressure and static pressure usually involve the use of an electro-mechanical pickoff, such as a potentiometer. Thus, in these prior art pressure gauge devices, the potentiometer wiper element moves along the potentiometer resistive element in response to pressure variations. It will be apparent that the sliding contact between the wiper and resistive elements of the potentiometer results in the introduction of frictional forces which have the effect of reducing the sensitivity of the instrument to small changes in pressure and of destroying its effectiveness at very high altitudes where the earth's atmosphere is rarified and, therefore, where the pressures are extremely small. Accordingly, lack of sensitivity has been an inherent disadvantage of earlier types of pressure gauge devices, with the result that there has been a long-felt need for an improved pressure gauge instrument.

The present invention is based on an electro-optical technique as well as a different kind of mechanical movement, the two together helping to eliminate the deleterious effects of friction normally encountered. More particularly, in an instrument incorporating the friction-reducing techniques of the present invention, a vane that is exposed and, therefore, subject to the fluid pressures involved is mounted on a flexure pivot, a simple lightweight coil being mounted, in turn, on the vane. The coil is coupled to a magnet positioned contiguously to the vane and is free to move toward or away from the magnet as the vane rotates in one direction or the other about the flexure pivot. By means of a servo loop, current is fed to the coil, the magnitude of the current being sufficient to return the coil to a stable position and, therefore, reposition, the vane at a point where the servosystem herein involved is rebalanced. The magnitude of the current is, therefore, a measure of the fluid pressures being exerted against the vane. The servo loop itself includes electro-optical apparatus by means of which the magnitude of the current fed back to the coil is related to the displacement of the vane. More specifically, a converging beam of light is reflected from a mirror on the vane to an optical detector which produces a voltage whose amplitude and polarity correspond to the angular displacement of the vane. By suitable amplification of this voltage, the feedback current for the coil is obtained. It will be apparent from what has been said that since an embodiment of the present invention would not include relative motion between contacting surfaces, friction is not a problem and, therefore, pressure measurements can be made with greatly increased accuracy.

It is, therefore, an object of the present invention to provide a pressure gauge instrument whose measurements are not affected by frictional forces.

It is another object of the present invention to provide a pressure gauge instrument having a degree of sensitivity not heretofore possible.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only and is not intended as a definition of the limits of the invention.

FIGURE 1 illustrates an embodiment of the present invention adapted for the measurement of pressures;

FIGURE 2 illustrates the embodiment of FIG. 1 adapted for the measurement of stagnation pressures; and FIGURE 3 is a pressure gauge instrument in accordance with the present invention that combines the features of the gauges in FIGS. 1 and 2.

Referring now to the drawings, reference is made to FIG. 1 wherein the embodiment therein is shown to include an instrument housing structure 10 through which is found an opening 11 divided into two chambers by a thin and lightweight vane 12, the two chambers mentioned being designated as chamber A and chamber B. However, vane 12 does not close off one chamber from the other, that is to say, vane 12 is not a membrane or diaphragm type of device and, therefore, it does not seal off chamber A from chamber B. Within housing 10 and located beneath opening 11 is another chamber, preferably a sealed chamber, designated 13, vane 12 extending into chamber 13 for some distance. As may be seen from the figure, vane 12 is mounted on and, therefore, is supported by a flexure pivot 14 which is preferably located at about the interface between opening 11 and chamber 13. This location for the pivot is preferred because a minimum angular displacement of the vane occurs at the pivot point so that only a minimum opening need be provided in the wall between the two chambers for the vane to pass through from one chamber to the other. The opening is designated 15 and to prevent leakage through the opening from chamber 11 to chamber 13, a shield 16 is provided which covers opening 15 but which does not hamper the free angular movements of vane 12 in the vicinity of flexure pivot 14. With respect to the flexure pivot, it may be a taut band pivot or a torsion bar suspension, both of these being frictionless in character.

Within chamber 13 and rigidly mounted beneath shield 16 is an E-shaped permanent magnet 17, the middle arm or middle bar of the magnet, designated 17a, being positioned partially into a coil 18 that is cylindrically wound on vane 12. The bottommost part of vane 12 is formed into a mirror 20, the coil and mirror counterbalancing the mass of that portion of the vane that extends above flexure pivot 14 and into opening 11. Also mounted within chamber 13 and below mirror 20 is a light source structure 21 and an optical detector in the nature of a photoelectric pick-off device that is designated 22. With respect to light source structure 21, it includes a source of light 23 and a lens arrangement 24 arranged to converge the light emanating from source 23. Light source structure 21 and its component parts is mounted in chamber 13 so that the light beam out of lens 24 is incident upon mirror 20 and reflected therefrom to optical detector 22. It is for this reason that structure 21 is rigidly mounted in the lower right-hand corner of chamber 13, as is shown in the figure. Optical detector 22 may be a single axis photoelectric pickoff device, preferably a single axis radiation tracking transducer which is a semiconductor device that generates a voltage whose amplitude and polarity vary as a spot of light is moved along the straight line between its two output terminals. A detailed description of a radiation tracking transducer of the kind that can be used herein may be found on pages 336–341 of an article entitled "Radiation Tracking Transducer" by D. Allen, I. Weiman, and J. Winslow, in the periodical entitled "IRE Transactions on Instrumentation," published in December 1960. Transducer 22 is also positioned to face mirror 20 and is spaced both from the mirror and the light source so that the converging light beam will impinge upon it as a spot of light.

Transducer 22 is coupled at its output end to a power amplifier 25 whose output, in turn, is fed back to coil 18. A meter 26 is connected across the lines leading from amplifier 25 to coil 18, the meter, as will be more fully understood later, being calibrated to provide an accurate reading of the relative pressures existing in chambers A and B in opening 11.

In its operation, an increase in pressure in chamber A, due to the local air or fluid flow, causes vane 12 to move in the direction of chamber B. Since the vane is suspended on frictionless pivot 14, the movement of the vane is actually a slight rotation about the suspension point. Thus, an increase in pressure in chamber A causes a counerclockwise rotation of the vane, which results in a corresponding movement of coil 18 and mirror 20. It will be seen from FIG. 1 that a counterclockwise movement of vane 12 causes coil 18 to move further upon magnet 17. As for mirror 20, its displacement from its neutral or null position causes the light spot incident upon transducer 22 to become correspondingly displaced from its axially zero position. The output signal or voltage from the transducer is applied to amplifier 25 whose output current, as was previously mentioned, is fed back to coil 18 where, in response to the interaction between the abovesaid current and the magnetic field of the magnet, a force is applied to the coil and, to the vane, that helps to balance the force exerted against the vane by the increased pressure in chamber A, flexure pivot 14 providing the rest of the restoring force that repositions the vane and the elements thereon. As will be recognized by those skilled in the art, the abovesaid restoring current through the coil is proportional to the force or pressure against the vane in either direction. Hence, as was specified earlier, meter 26 can be calibrated to provide a direct reading of the pressures or forces involved.

By redesigning housing structure 10 somewhat differently, specifically opening 11 and chamber 13 therein, and by rearranging the identical elements shown in the FIG. 1 instrument, a pressure gauge may be obtained for the accurate measurement of stagnation or ram pressures. Such a pressure gauge is illustrated in FIG. 2 wherein the elements thereof are designated as they were in FIG. 1 since they are, in fact, the same. As will be seen from a comparison of the two figures, the only difference between them is in the housing structures, the housing structure in the FIG. 2 instrument having several ports or vent holes, such as vent hole 27, in order to provide for leakage. This was not necessary in the FIG. 1 instrument because fluid entering one of the two chambers in opening 11 would leak around vane 12 into the other chamber and thereby make its escape. Since the construction and operation of the FIG. 2 instrument is substantially the same as that of the FIG. 1 instrument, to avoid being redundant, suffice it to say that the detailed description previously applied to explain the FIG. 1 instrument is equally applicable here in connection with the FIG. 2 instrument. Thus, pressures exerted through opening 11 against vane 12 cause the displacement of the vane in a counterclockwise direction and this, in turn, ultimately produces a deflection of the spot of light on transducer 22 from its zero or null position. In response to the feedback current from amplifier 25, and the electromagnetic interaction between that current and the field of the magnet, the vane and the mirror thereon are forced to return to a stable immediate position. As before, meter 26 measures the restoring current out of amplifier 25 and, therefore, also measures the pressures existing in opening 11.

The instruments shown in FIGS. 1 and 2 may be combined in a single housing structure to form a composite instrument having extreme sensitivity and a very wide dynamic range in its measurement of ram or stagnation pressures as well as any other pressures that may be encountered. Such a composite instrument is clearly illustrated in FIG. 3 and, as may be seen from it, two pressure gauges of the kind shown in FIG. 1 are utilized in the composite instrument of FIG. 3, one of these two instruments being at 90° to the position of the other of them. A two-axes relative pressure meter is thereby devised. In all other respects, the individual instruments constituting the composite instrument of FIG. 3 are identical with the instruments shown in FIGS. 1 and 2.

Although a couple of arrangements of the invention have been illustrated above by way of example, it is not intended that the invention be limited thereto. Accordingly, the invention should be considered to include any and all modifications, alterations or equivalent arrangements falling within the scope of the annexed claims.

Having thus described the invention, what is claimed is:

1. A pressure gauge comprising: a housing structure having an opening through which a fluid may flow; a vane mounted on a flexure pivot, the vane to one side of said pivot extending almost across said opening; a magnet mounted near the vane on the other side of said pivot; a coil mounted on the vane on said other side and coupled to said magnet; a mirror mounted on the vane on said other side; optical apparatus for providing a measure of the displacement of said vane from its null position, said apparatus including means for projecting a converging beam of light against said mirror, and an optical detector that produces a voltage whose amplitude and polarity correspond to the position of a spot of light incident thereon, said optical detector being positioned to receive the beam of light reflected from said mirror as a spot of light; and a feedback circuit coupled between said optical detector and said coil for applying a restoring current to said coil in response to the voltage produced by said optical detector.

2. The pressure gauge defined in claim 1 wherein said optical detector is a radiation tracking transducer.

3. A pressure gauge comprising: a housing structure having an opening therethrough and a sealed chamber; a vane rotatably mounted on a flexure pivot and extending from the pivot into said chamber and across said opening; a magnet mounted in said chamber near said vane; a coil mounted on said vane and coupled to said magnet; and electro-optical apparatus for producing a flow of current through said coil whose magnitude and polarity correspond to the displacement of said vane from its null position in response to fluid pressures exerted against said vane.

4. The pressure gauge defined in claim 3 wherein said opening is partitioned by said vane to substantially form two chambers, thereby providing a gauge capable of measuring fluid pressures originating at one end of said opening or the other.

5. A pressure gauge comprising: a housing structure having a chamber and an opening leading into said chamber, said housing structure also having vent holes through the walls of said chamber; a vane rotatably mounted on a flexure pivot and extending from the pivot into said chamber and substantially across the neck of said opening; a magnet mounted in said chamber near said vane; a coil mounted on said vane and coupled to said magnet; and electro-optical apparatus for producing a flow of current through said coil whose magnitude and polarity correspond to the displacement of said vane from its null position in response to fluid pressures exerted against said vane.

6. The pressure gauge defined in claim 5 wherein said electro-optical apparatus includes a mirror mounted on said vane, means for projecting a converging beam of light against said mirror, an optical detector that produces a voltage whose amplitude and polarity correspond to the position of a spot of light incident thereon, said optical detector being positioned to receive the beam of light reflected from said mirror as a spot of light; and a feedback circuit coupled between said optical detector and said coil for producing said flow of current through said coil.

7. The pressure gauge defined in claim 6 wherein said optical detector is a radiation tracking transducer.

References Cited by the Examiner
UNITED STATES PATENTS

| | | | |
|---|---|---|---|
| 2,017,858 | 10/35 | Halstead | 250—231 X |
| 2,358,103 | 9/44 | Ryder | 250—231 X |
| 2,383,757 | 8/45 | Ziebolz | 73—228 X |
| 2,593,339 | 4/52 | Ostermann et al. | 73—228 |
| 2,597,899 | 5/52 | Payne. | |

OTHER REFERENCES

Allen et al.: "Radiation Tracking Transducer"; IRE Transactions on Instrumentation; vol. I–9, No. 3; December 1960; pages 336 to 341.

GPE Controls publication for Model 776F Flow Transmitter; published by GPE Controls, Inc., 240 East Ontario Street, Chicago 11, Illinois; 4 pages.

RICHARD C. QUEISSER, *Primary Examiner*.